United States Patent [19]

Massey

[11] 4,260,947
[45] Apr. 7, 1981

[54] PHASE CONTROL CIRCUIT FOR REGULATING POWER

[76] Inventor: David T. Massey, 3742 W. Shangri-La Rd., Phoenix, Ariz. 85029

[21] Appl. No.: 840,743

[22] Filed: Oct. 11, 1977

[51] Int. Cl.³ ............................................. G05F 1/455
[52] U.S. Cl. .................................................... 323/322
[58] Field of Search ............ 307/252 UA, 252 N, 262, 307/269, 222 R, 252 H; 323/22 SC, 24, 18, 19, 34–39; 328/48, 44, 75

[56] References Cited

U.S. PATENT DOCUMENTS

| | | | |
|---|---|---|---|
| 3,452,214 | 6/1969 | Martin | 323/22 SC |
| 3,504,204 | 3/1970 | Carrive | 307/252 N |
| 3,541,429 | 11/1970 | Martin | 323/22 SC |
| 3,611,097 | 10/1971 | Joslyn | 323/24 |
| 3,691,452 | 9/1972 | Aguiar | 323/24 |
| 3,735,241 | 5/1973 | O'Sullivan | 323/22 SC |
| 3,811,054 | 5/1974 | Wern et al. | 307/252 H |
| 3,963,947 | 6/1976 | Bogel | 323/22 SC |
| 3,967,172 | 6/1976 | Denny | 318/806 |
| 3,968,401 | 7/1976 | Bryant | 307/222 R |
| 3,970,919 | 7/1976 | Butcher | 323/19 |

OTHER PUBLICATIONS

"Binary Rate Multiplier Controls AC Power" by A. Wallner; Weston Instruments, Inc., Jan. 1972, pp. 50–51.

Primary Examiner—A. D. Pellinen
Attorney, Agent, or Firm—Harry M. Weiss

[57] ABSTRACT

This relates to a phase control circuit for regulating the amount of power applied to an a.c. device by triggering on a thyristor at some time during each half cycle of an a.c. signal applied thereto. The thyristor turns off at the next zero crossover of the a.c. signal. When a first counter reaches a predetermined state, a trigger pulse is generated. The length of time it takes the first counter to reach the predetermined state can be varied by periodically loading the first counter with the contents of an up/down counter. The contents of the up/down counter may be varied by an operator or by associated circuitry.

17 Claims, 15 Drawing Figures

PHASE CONTROL CIRCUIT FOR REGULATING POWER

BACKGROUND OF THE INVENTION

This invention relates generally to phase control circuits and, more particularly, to a digital circuit for providing an output pulse which is accurately positioned with respect to the zero crossover points of an a.c. line signal.

The use of analog and RC circuits for controlling the phase firing of thyristors in a.c. circuits is well known. It is intended that these circuits control how long an a.c. powered device remains "on" during a particular a.c. cycle. For example, U.S. Pat. No. 3,967,172 describes an RC control circuit which controls the speed of an alternating current motor in a refrigeration system. However, due to the inherent characteristics of the circuit components (resistors, capacitors and coils), continuous, accurate, and absolute control over the full a.c. cycle is impossible partially due to what may be referred to as "firing point drift". Thus, the disclosed circuit is of limited value. Further, the disclosed control circuit is complex and costly; factors which must be seriously considered since less than optimum control is being achieved.

U.S. Pat. No. 3,968,401 describes a circuit for controlling the intensity of a light source. While many of the components of this circuit are of a digital nature, an analog control signal is generated thus presenting those problems described above in connection with "firing point drift".

Another problem associated with known phase control circuits is their lack of interchangeability. The control circuit of U.S. Pat. No. 3,967,172, described briefly hereinabove, cannot be substituted for the control circuit described in U.S. Pat. No. 3,968,401.

SUMMARY OF THE INVENTION

It is an object of the present invention to provide an improved phase control circuit.

It is a further object of the present invention to provide an accurate, reliable and economical circuit for controlling the firing of thyristors in a.c. circuitry.

It is a still further object of the invention to provide a phase control circuit which can be used in conjunction with a large number of products, i.e. military, commercial, industrial and consumer oriented products and sub-assemblies.

It is a further object of the invention to provide a phase control circuit which is both simple and safe to operate. A safety feature provided by the present invention is total operator isolation from the a.c. line.

It is still another object of the invention to provide a phase control circuit which consumes little current (a few nanoamperes), operates at low voltage (typically 3 volts to 18 volts) and has high noise immunity.

It is a still further object of the present invention to provide a full range of phase control over an a.c. cycle, presently impossible using known circuits, by employing only digital techniques in the generation of the control signal.

According to a broad aspect of the invention there is provided a method for generating a pulse in synchronism with zero crossover points of an applied signal, comprising the steps of generating said pulse responsive to the zero crossover points at a predetermined time, and varying said predetermined time.

According to another broad aspect of the invention there is provided a method for varying the length of time during which a device has electrical power applied thereto comprising the steps of periodically generating a pulse for enabling the application of power to said device at a predetermined time, and varying said predetermined time.

According to still another broad aspect of the invention, there is provided a circuit for varying the length of time during which a device has electrical power applied thereto. This circuit comprises generating means for generating a pulse for enabling the power at a predetermined time, and means for changing the predetermined time.

According to a still further broad aspect of the invention, there is provided a circuit for generating a pulse in synchronism with zero crossover points of an applied signal. The circuit comprises means responsive to the zero crossover points for generating the pulse at a predetermined time and means for varying the predetermined time.

The above and other objects, features and advantages of the present invention will be more clearly understood from the following detailed description taken in conjunction with the accompanying drawings, in which:

DESCRIPTION OF THE PREFERRED EMBODIMENT

Figure 1:
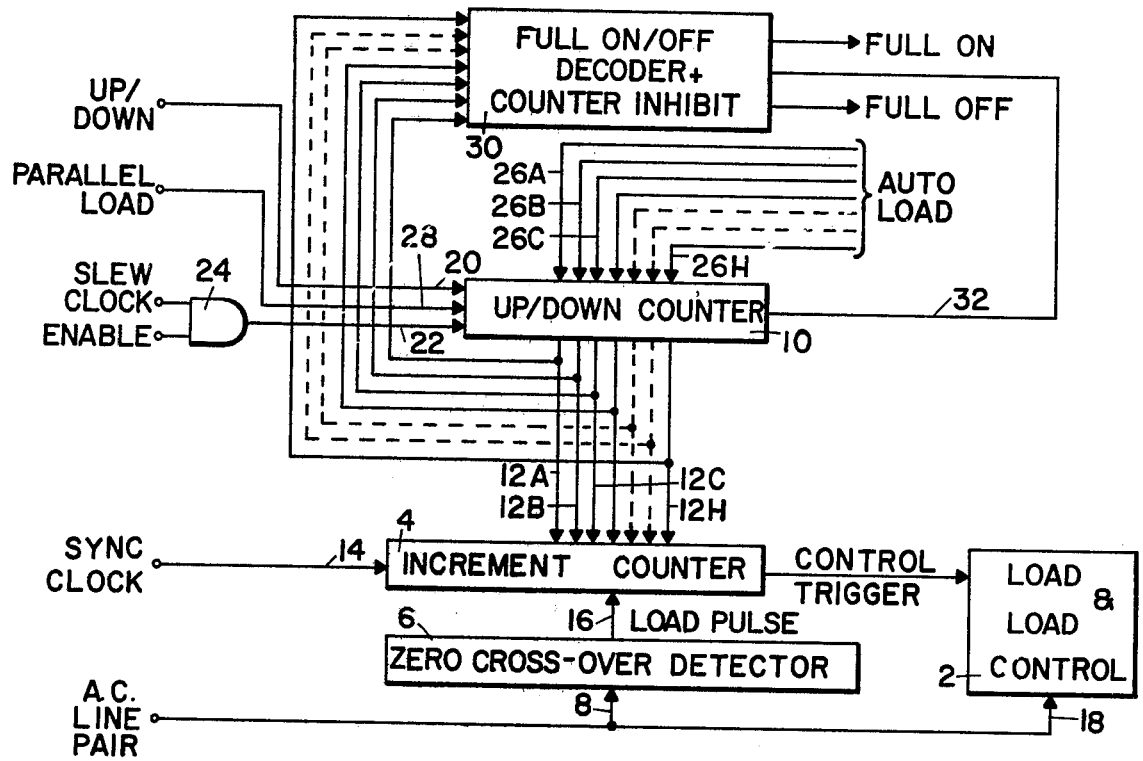
FIG. 1 is a functional block diagram of a digital full wave a.c. phase control circuit according to the present invention.

FIG. 1 is a functional block diagram of a programmable and universal, digital full wave a.c. phase control circuit according to the present invention.

Load and load control 2, not considered a part of the invention, may be any device for which phase control is desired, e.g. a lamp, an electric motor, a heater, etc. To explain the inventive phase control circuit, it will be assumed that load 2 is an electric lamp having its power input coupled to the output of a triac.

In order to provide phase control over the entire a.c. cycle, it is necessary that the triac be triggered "on" by increment counter 4 at least once every one-half cycle. To accomplish this, a zero crossover detector monitors the a.c. line signal which is applied at terminal 8 and generates a load pulse each time the a.c. signal crosses zero. If the line signal is a standard 60 Hz signal, load pulses will be generated at a frequency of 120 Hz. Each load pulse applied at input 16 of increment counter 4 causes the contents of up/down counter 10 to be loaded into increment counter 4 over lines 12a–12h. The sync clock signal which is applied to increment counter 4 at input 14 is chosen such that a maximum count will be reached, each time resulting in a control trigger, every one-half cycle or 120 Hz for triggering the triac and turning on the lamp. The triac will of course be triggered "off" by the zero crossing of the a.c. line signal applied at input 18. Thus it can be seen that for each half cycle of line signal, load 2 will be energized for a fraction of the half cycle.

Figure 2A:
FIGS. 2a-2f are waveforms for assisting in the explanation of the circuit in FIG. 1.
Figure 2B:
Figure 2C:
Figure 2D:
Figure 2E:
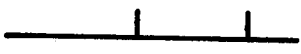
Figure 2F:
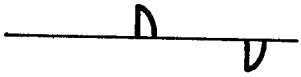

For an understanding of how the fraction of a half cycle during which load 2 is energized may be varied, attention is drawn to FIGS. 2a–2f. FIG. 2a shows a typical a.c. line signal and FIG. 2b shows a series of load pulses generated by zero crossover detector 6 and applied to increment counter 4. Each load pulse causes the contents of up/down counter 10 to be loaded into increment counter 4. Let us assume that the count loaded into increment counter 4 is approximately one half its maximum count capability. Since its maximum count capability corresponds to a full one-half cycle, half of its maximum count capability will result in a control trigger at approximately the middle of each half cycle as shown in FIG. 2c. Since the load 2 will be triggered "on" by the control trigger and "off" by the zero crossing of the a.c. line signal, the load energization curve will appear as in FIG. 2d. If now the count loaded into increment counter 4 is approximately one-fourth its maximum count capability, control triggers generated will be positioned as shown in FIG. 2e, i.e. approximately three-fourths of the distance between successive zero crossings of the a.c. line signal. This results in a load energization curve of the type shown in FIG. 2f. Clearly now, the greater the number loaded into increment counter 4, the sooner a control trigger will be generated. Since the above referred triac is turned "on" by the control trigger and "off" by the next zero crossing of the a.c. line signal, the greater the number loaded into increment counter 4, the longer the triac will be "on" during each half cycle thus resulting in a greater light intensity.

Referring back to FIG. 1, up/down counter 10 has a count capability no greater than that of increment counter 4 and may be made to count up or down by properly energizing an up/down input and enabling a slew clock signal to be applied at input 22. While the sync clock rate was determined by the a.c. line frequency, the slew clock rate is independent of all components and variables and can be varied to suit a particular application. The above referred to enabling of the slew clock is shown functionally in FIG. 1 as including an AND gate 24 having the slew clock signal as a first input and an enable signal as a second input.

Instead of allowing up/down counter 10 to operate as described above, a predetermined count may be loaded via lines 26a–26h if parallel load input 28 is enabled and the slew clock is disabled. In this manner, the inventive phase control circuit may be, for example, coupled to and used in conjunction with a microprocessors and advanced memory systems to create unlimited functional control via programmability.

Each of the outputs of up/down counter 10 are applied not only to increment counter 4 but also to a full on/off decoder and counter inhibit. This decoder determines if up/down counter 10 is in its minimum or maximum state and, if so, it halts up/down counter 10 to prevent run-over of data input or control signals into the next occurring a.c. half cycle. This is accomplished via inhibit line 32. Further, decoder 30 generates "full on" and "full off" signals corresponding to maximum count and minimum count respectively.

Now that the inventive phase control circuit has been described generally, certain portions of the system will be described in more detail. However, it is to be understood that the following is given by way of example only and is not intended to limit the scope of the invention.

Figure 3:
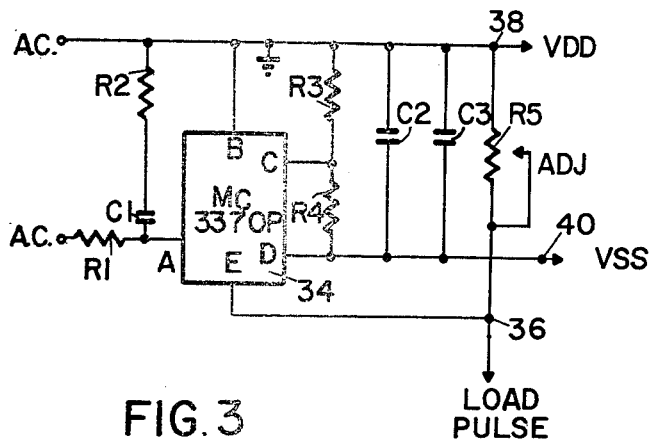
FIG. 3 is a more detailed schematic diagram of the zero crossover detector in FIG. 1.

Referring to FIG. 3, there is shown a zero crossover detector circuit incorporating an MC3370P zero voltage switch 34 manufactured by Motorola Semiconductors, Phoenix, Arizona. The a.c. line signal is applied to terminal b of switch 34 and terminal a of switch 34 after passage through resistor R1, which resistor acts as a voltage reducing resistor and by proper selection, may be used to derive a desired load pulse width. The series combination of resistor R2 and capacitor C1 provides noise rejection. Resistors R3 and R4 are reference resistors, and capacitors C2 and C3 provide for further noise rejection and ripple suppression. This circuit not only provides for the required load pulse at 36, and may provide the logic voltages Vdd and Vss at 38 and 40 respectively which are required by the remainder of the digital phase control circuit. Adjustable resistor R5 is provided for achieving a properly shaped load pulse.

Figure 4:
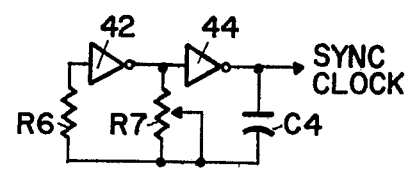
FIG. 4 is a circuit diagram for generating the sync clock signal used by the apparatus of FIG. 1.

In FIG. 1, the sync clock which is applied to increment counter 4 via terminal 14 was shown and described as merely an input of sufficient frequency to provide a control trigger at least once every half cycle. FIG. 4 shows one example of a digital oscillator which comprises two inverters 42 and 44, capacitor C4, resistor R6 and adjustable resistor R7. These components may be adjusted and selected to provide a sync clock signal of a desired frequency.

Figure 5:
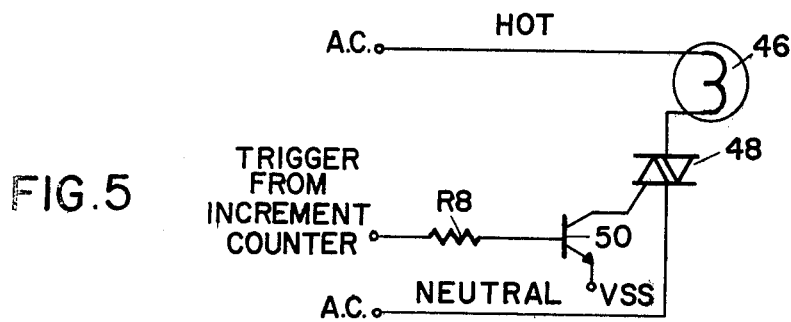
FIG. 5 is a schematic diagram of a lamp circuit for use as the load in FIG. 1.

In the description of FIG. 1, it was stated that the load 2 could be a lamp having its power input controlled by a triac. FIG. 5 shows such an arrangement. A lamp 46 is coupled to the a.c. line signal and to the output of triac 48. The triac is likewise coupled to the a.c. line signal and to the collector of transistor 50. A control trigger from increment counter 4 is applied to the base of transistor 50 via resistor R8 rendering the transistor conductive and switching triac 48 "on". In this manner, a.c. power will be delivered to lamp 46 until the next zero crossing of the a.c. signal.

Figure 6:
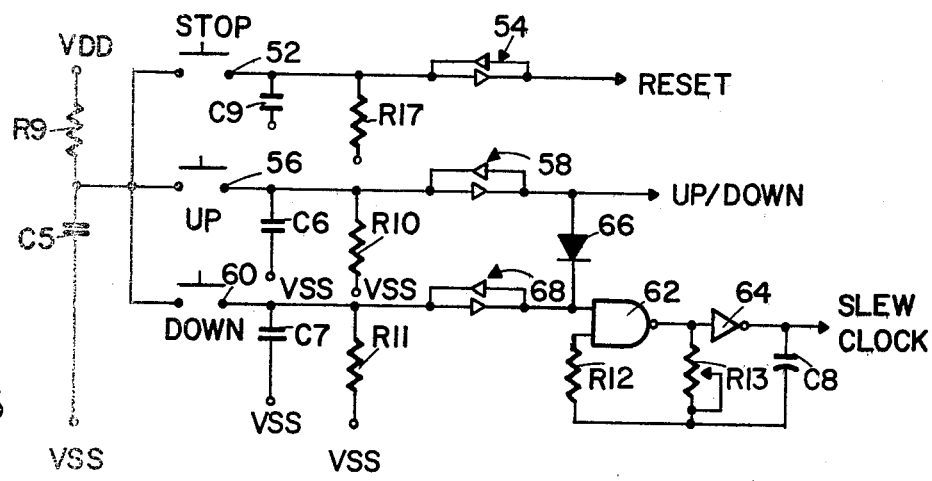
FIG. 6 is a circuit diagram of an oscillator for generating the slew dock signal and apparatus for generating control signals used in the up/down counter of FIG. 1.

FIG. 6 shows a second digital oscillator for generating the slew clock signal and additional apparatus for generating other control signals used by the up/down counter. A first mechanical switch 52, when closed, generates a reset signal which is applied via debounce circuit 54 to up/down counter 10. A second switch 56 when closed causes a voltage to be applied to up/down counter 10 via debounce circuit 58 instructing it to count up. Capacitors C6, C7 and C9 and Resistors R10, R11 and R17 each coupled to Vss function together to eliminate voltage spikes which result from operation of the mechanical switches. Switch 60, while called a "down" switch enables the slew clock oscillator comprising gate 62, inverter 64, capacitor C8, resistor R12 and adjustable resistor R13 via debounce circuit 68.

Since switch 56, when "open" instructs counter 10 to count down, switch 60 when "closed" will enable the slew clock oscillator. When switch 56 is closed and switch 60 open, the oscillator is enabled via diode 66. It should be apparant that the circuit is operational even if diode 66 is removed as long as switch 60 is closed to enable the slew clock oscillator. Capacitor C7 and resistor R11 eliminate voltage spikes resulting from the operation of switch 60. Components R12, R13 and C8 may be selected and adjusted to yield a slew clock signal of a desired frequency. It should be clear that switches 52, 56 and 60 may be mechanical, ultrasonic, optical, analog or RC switches.

Figure 7:
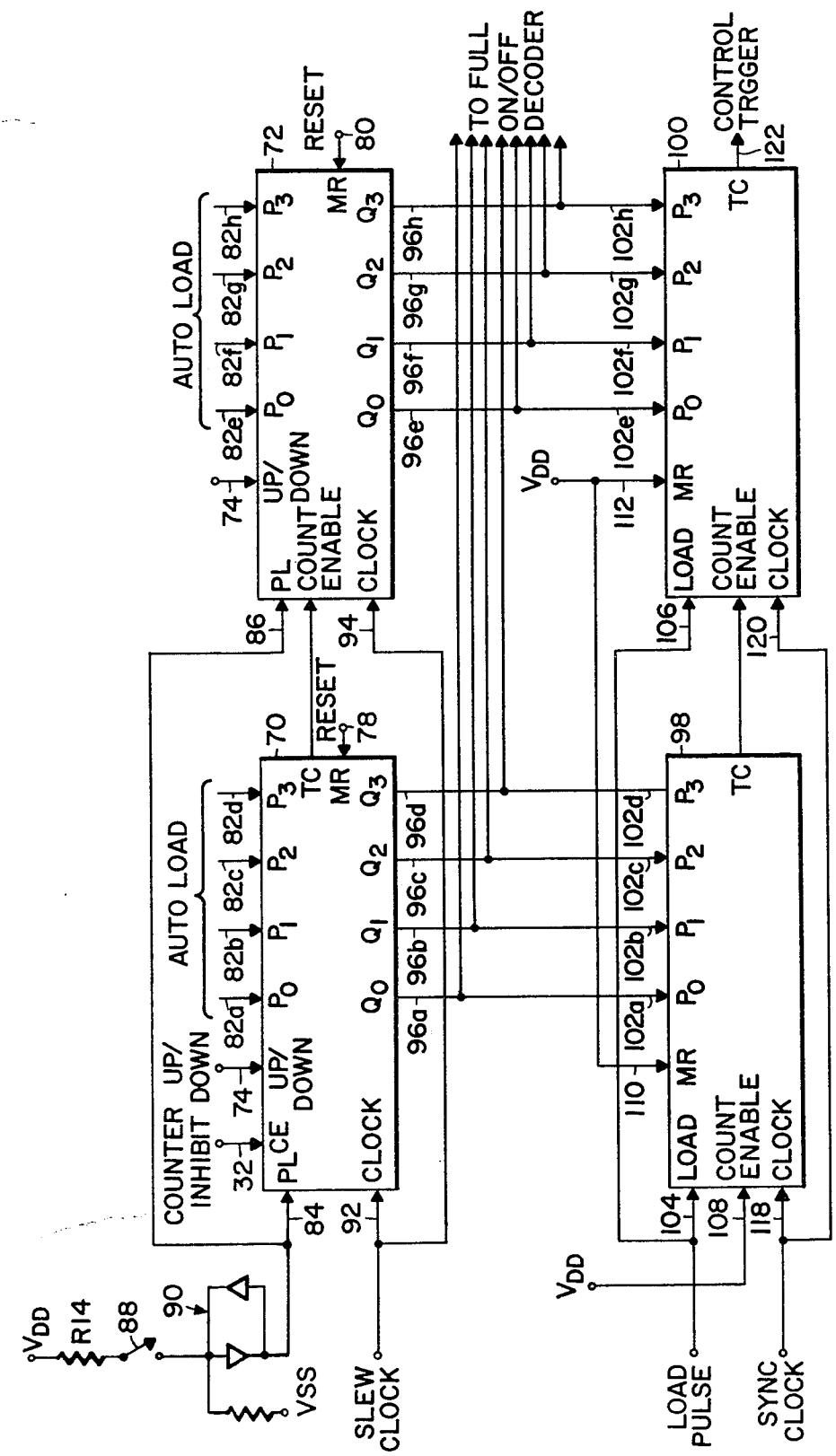
FIG. 7 is a block diagram illustrating in more detail the up/down counter and increment counter of FIG. 1.

FIG. 7 is a block diagram of a specific embodiment of the up/down counter 10 and increment counter 4 shown in FIG. 1. Two 4-bit up/down counters 70 and 72 are cascaded to form a single 8-bit up/down counter. Such 4-bit up/down counters are commercially available from, for example, Mortorola Semiconductor, Phoenix, Arizona, and bear the part number MC14516P. It can be seen that each 4-bit up/down counter has an up/down control input 74 and 76; a master reset input 78 and 80; four ($P_0$–$P_3$) parallel load data inputs 82a–82h; a parallel load control input 84 and 86 each coupled to Vdd via R14, switch 88 and debounce circuit 90; a slew clock input 92 and 94; and four ($Q_0Q_3$) output data bits 96a–96h.

The increment counter (4 in FIG. 1) comprises two 4-bit binary counters 98 and 100 cascaded together to form an 8-bit binary counter. Each 4-bit counter has four ($P_0P_3$) parallel load date inputs 102a–102h for receiving data from outputs 96a–96h respectively each time a load pulse is received at 104 and 106. Such 4-bit binary counters are commercially available from Motorola Semiconductor, Phoenix, Ariz. and bear a part number MC14161P. The count enable 108 and master reset inputs 110 and 112 are tied to Vdd. The sync clock signal is applied to binary counters 98 and 100 at inputs 118 and 120. Finally, the control trigger is taken off counter 100 at 122. As a result of using an 8-bit counter, there are 256 trigger points in each half a.c. cycle yielding full "off" to full "on" control.

Since it is desired to have at least one control trigger generated for each half cycle of line signal or 120 triggers per second for a 60 Hz a.c. line signal the sync clock rate must be at least $120 \times 16 \times 16 = 30,720$ Hz.

Figure 8:
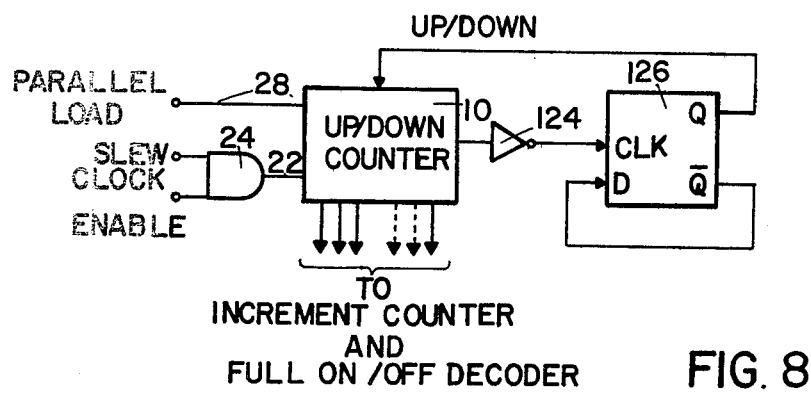
FIG. 8 is a block diagram of an alternate means for controlling the up/down counter of FIG. 1.

FIG. 8 illustrates an alternate means of controlling the counting operation of up/down counter 10. In this case, the output of counter 10 is applied via inverter 124 to the clock input of flip-flop 126. The $\overline{Q}$ output of flip-flop 126 is applied to the DATA (D) input, and the Q output is applied to the up/down control input of counter 10. Thus, when Q=1 and the counter begins counting up, the intensity of the lamp being controlled will increase until a maximum count has been reached. At this point, flip-flop 126 will be clocked causing it to change state; i.e. Q="0". The counter will now count down until a minimum condition has been attained. The flip-flop, at this point again changes state and the process is repeated. With this arrangement, an operator merely enables the slew clock signal and awaits the desired lamp intensity irrespective of whether this represents an increase or decrease in intensity.

Figure 9:
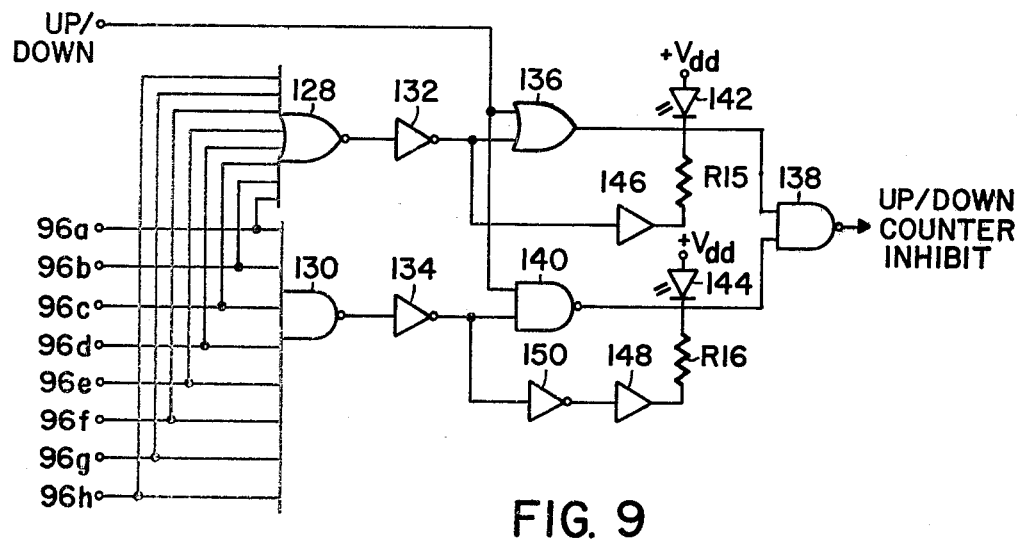
FIG. 9 is a detailed block diagram of the full on/off decoder and counter enable of FIG. 1.

FIG. 9 is a detailed logic diagram of the full on/off decoder and counter inhibit 30 shown generally in FIG. 1. The data outputs 96a–96h (FIG. 7) from the up/down counter are applied to the inputs of NOR gate 128 and NAND gate 130. The output of NOR gate 128 is applied to the input of invertor 132 output of which is applied to the input of OR gate 136 in conjunction with the up/down control signal. The output of OR gate 136 is applied to a first input of NAND gate 138. The output of NAND gate 130 is applied to inverter 134, the output of which is applied to NAND gate 140 in conjunction with the up/down control signal. The output of NAND gate 140 is applied to the second input of NAND gate 138. The output of NAND gate 138 is applied to a "counter inhibit" input of the up/down counter (FIG. 7). In this manner, whenever the slew pulse up/down counter is counting up and a maximum condition is realized, the up/down counter will be halted. Likewise, when the up/down counter is counting down and a minimum condition is reached, the up/down counter will be halted. This may be used to prevent run over of data input or control signals to the next occurring a.c. half cycle. Besides halting the operation of the up/down counter, light emitting diode (LED) 144 gives a visual indication when the up/down counter is in a maximum state. LED 144 is coupled between Vss and the output of inverter 134 via resistor R16, buffer gate 148 and invertor 150. Likewise, LED 142 gives a visual indication when the up/down counter is in a minimum state. LED 142 is coupled between Vdd and the output of inverter 132 via resistor R15 and buffer gate 146.

Figure 10:
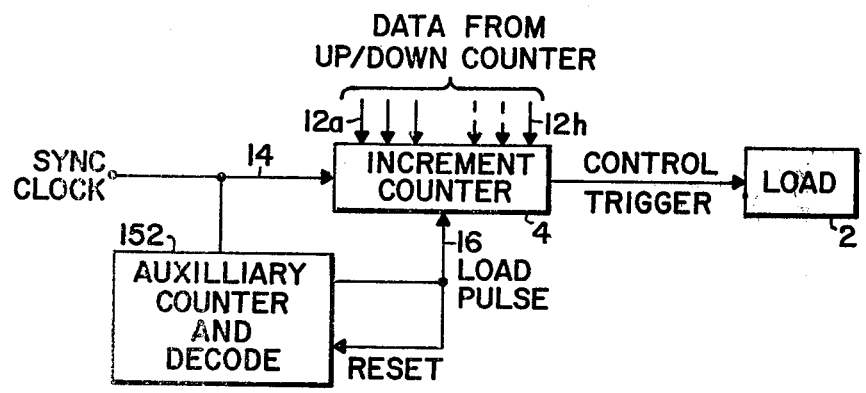
FIG. 10 is a partial block diagram of a modification of the circuit of FIG. 1 to enable use of said circuit in a d.c. system.

The above described control circuit can also be employed in a d.c. system, e.g. controlling the speed of a d.c. motor, by using an auxilliary clock system which may generate artificial load signals. Referring to FIG. 10, the sync clock signal is not only applied to increment counter 4 at 14, but is also applied to an auxilliary counter 152. A predetermined state of this counter may be decoded in accordance with known techniques to provide a load pulse for "LOADING" the data ON inputs 12a–12h into the increment counter 4 as described hereinabove. The resultant load pulse may be used to reset the load pulse generating apparatus.

Thus, there has been provided a versatile programmable digital full wave phase control circuit which is accurate, efficient, reliable and economical. It is simple to operate with total operator isolation from the line voltage and current. With such a suitable control circuit, wide use could result in considerable energy savings since electrically powered devices rarely require maximum power for satisfactory operation.

In the interest of completing the above description, the following is a table of component values used in the above description:

| ITEM | VALUE |
| --- | --- |
| R1 | 20KΩ |
| R2 | 33KΩ |
| R3 | 10KΩ |
| R4 | 10KΩ |
| R5 | 10KΩPOT. |
| R6 | 1KΩ |
| R7 | 50KΩPOT. |
| R8 | 5.6KΩ |
| R9 | 1KΩ |
| R9 | 1KΩ |
| R10 | 56KΩ |
| R11 | 56KΩ |
| R12 | 1KΩ |
| R13 | 50KΩPOT. |
| R14 | 1KΩ |
| R15 | 470Ω |
| R16 | 470Ω |
| C1 | 0.1μf |
| C2 | 0.1μf |

-continued

| ITEM | VALUE |
|---|---|
| C3 | 500 |
| C4 | 1000 PFD |
| C5 | 0.1μf |
| C6 | 0.1μf |
| C7 | 0.1μf |
| C8 | 1mf |
| C9 | 0.1μf |
| R17 | 56KΩ |

While the invention has been particularly shown and described with reference to the preferred embodiments above, it will be understood by those skilled in the art that the foregoing and other changes in the form and details may be made therein without departing from the spirit and scope of the invention.

What is claimed is:

1. A digital circuit for generating a trigger pulse in response to zero crossover points of an applied AC signal, said trigger pulse occurring at any desired point between adjacent zero crossover points, comprising:
   first digital counting means responsive to said zero crossover points for generating said trigger pulse when said first digital counting means has counted up to a predetermined state;
   receiving means directly connected to said AC signal for generating therefrom load pulses at said zero crossover points and at least one DC signal which is a supply voltage for the remainder of said digital circuit, said load pulses being applied to said first digital counting means;
   digital means for varying the time it takes said first digital counting means to reach said predetermined state, said digital means for varying comprising an up/down digital counter having a plurality of parallel outputs coupled to said first digital counting means for loading the contents of said up/down counter into said first digital counting means at the occurrence of said load pulse; and
   control means for automatically increasing and decreasing the contents of said up/down digital counter.

2. A circuit according to claim 1 wherein said first digital counting means comprises:
   a binary counter having parallel inputs coupled to said plurality of outputs of said up/down digital counter such that at the occurrence of said load pulse, the contents of said up/down digital counter is parallel loaded into said binary counter.

3. A circuit according to claim 2 further including decoding means coupled to said up/down counter for inhibiting said up/down counter when the minimum and maximum states are detected.

4. A circuit according to claim 3 wherein said decoding means also includes means for generating a signal when said minimum and maximum states are detected.

5. A circuit according to claim 4 wherein said means for generating a signal comprises at least one light emitting diode.

6. A circuit according to claim 2 wherein said control means includes a first input for receiving a first clock pulse signal of a predetermined frequency and means for controlling the direction of count.

7. A circuit according to claim 6 wherein said binary up/down counter includes a plurality of inputs for receiving signals representing a remotely generated count and means for parallel loading said remotely generated count into said up/down counter.

8. A circuit according to claim 6 wherein said means for controlling comprises a switch which when in a first state instructs said up/down counter to count "up" and when in a second state instructs said up/down counter to count "down".

9. A circuit according to claim 6 wherein said means for controlling also enables said up/down counter to count.

10. A circuit according to claim 6 further including means for generating said first clock pulse signal.

11. A circuit according to claim 10 further including means for generating a second clock signal for application to said binary counter, said second clock signal having a frequency such that at least one control trigger is generated for each a.c. half cycle.

12. A circuit according to claim 11 wherein said binary counter is an 8-bit binary counter and said second clock signal has a frequency of 30,720 Hz to provide a trigger pulse for each half cycle of a 60 Hz a.c. signal.

13. A digital circuit for generating a trigger pulse in response to zero crossover points of an applied AC signal, said trigger pulse occurring at any desired point between adjacent zero crossover points, comprising:
   first digital counting means responsive to said zero crossover points for generating said trigger pulse when said first digital counting means has counted up to a predetermined state;
   receiving means for receiving said AC signal and for generating therefrom load pulses at said zero crossover points and at least one DC signal which is a supply voltage for the remainder of said digital circuit;
   digital means for varying the time it takes said first digital counting means to reach said predetermined state, said digital means for varying comprising an up/down digital counter having a plurality of parallel outputs coupled to said first digital counting means for loading the contents of said up/down counter into said first digital counting means at the occurrence of said load pulse, said first digital counting means comprising a binary counter having parallel inputs coupled to said plurality of outputs of said up/down digital counter such that at the occurrence of said load pulse, the contents of said up/down digital counter is parallel loaded into said binary counter; and
   control means for automatically increasing and decreasing the contents of said up/down digital counter, said control means including means coupled to said up/down counter for causing it to repeatedly count from a minimum to a maximum state and back to said minimum state until said control means is disabled.

14. A digital circuit for varying the length of time during which a device has electrical power applied thereto, comprising:
   receiving means connected to an AC signal for generating therefrom load pulses at zero crossover points and at least one DC signal which is a supply voltage for the remainder of said digital circuit;
   first digital counting means for generating a trigger pulse at any desired point between adjacent zero crossover points, said trigger pulse being generated when said counting means has counted up to a desired state;

digital means for varying the time it takes said first digital counting means to reach said desired state, said means for varying comprising an up/down binary counter having a plurality of parallel outputs coupled to said first digital counting means, said first digital counting means being a binary counter having inputs coupled to said parallel outputs, the contents of said up/down counter being loaded into said binary counter at the occurrence of a load pulse;

means for changing the state of said up/down counter; and digital means for generating load pulses at said zero crossover points for application to said first digital counting means to load said first digital counting means with the contents of said up/down counter, said load pulses being generated at a frequency such that at least one load pulse occurs during the time it would take said first digital counting means to count from its minimum to its maximum state.

15. A circuit according to claim 14 wherein said binary up/down counter includes a first input for receiving a first clock pulse signal of a predetermined frequency and means for controlling the direction of count.

16. A circuit according to claim 15 wherein said binary up/down counter includes a plurality of inputs for receiving signals representing a remotely generated count and means for parallel loading said remotely generated count into said up/down counter.

17. A circuit according to claim 16 further including decoding means coupled to said up/down counter for inhibiting said up/down counter when the minimum and maximum states are detected.

* * * * *